United States Patent

[11] 3,620,385

[72] Inventors Leopold Petrus Johannes Vermeijlen
Emmasingel, Eindhoven, Netherlands;
Friedrich Laa, Vienna, Austria
[21] Appl. No. 847,969
[22] Filed Aug. 6, 1969
[45] Patented Nov. 16, 1971
[73] Assignee U. S. Philips Corporation
New York, N.Y.
[32] Priority Aug. 14, 1968
[33] Austria
[31] A 7973/68

[54] CONVEYING APPARATUS FOR A MAGNETIC TAPE CARTRIDGE CHANGER
15 Claims, 6 Drawing Figs.

[52] U.S. Cl. .......... 214/6 D, 242/181, 274/4 F
[51] Int. Cl. .......... B65h 1/00
[50] Field of Search .......... 53/161; 214/6 D, 6; 274/4 F; 179/100.2 Z; 242/180, 181, 198; 340/174.1

[56] References Cited

UNITED STATES PATENTS

| | | | |
|---|---|---|---|
| 2,617,700 | 11/1952 | Christie et al. | 214/16.1 Z X |
| 3,289,962 | 12/1966 | Gellenthin, Jr. | 242/181 |
| 3,477,726 | 11/1969 | Laschenski | 274/4 F |

*Primary Examiner*—Gerald M. Forlenza
*Assistant Examiner*—Robert J. Spar
*Attorney*—Frank R. Trifari

ABSTRACT: A magnetic tape cartridge changer for playing a plurality of stacked tape cartridges in sequence. The changer is provided with a shaft for the storage of the stacked cartridges and has a lateral outlet aperture for automatic removal of the lowest stacked cartridge which is in the playing position. The removed cartridge is passed into a channel which ultimately feeds the cartridge back to a ready to play storage position in the shaft.

INVENTORS
LEOPOLD P.J. VERMEIJLEN
FRIEDRICH LAA
BY
AGENT

INVENTORS
LEOPOLD P. J. VERMEIJLEN
FRIEDRICH LAA
BY
AGENT

INVENTORS
LEOPOLD P.J. VERMEIJLEN
FRIEDRICH LAA
BY
AGENT

CONVEYING APPARATUS FOR A MAGNETIC TAPE CARTRIDGE CHANGER

The invention relates to a conveying apparatus for a magnetic tape cartridge changer for playing a plurality of stacked tape cartridges in sequence. The changer is provided with a shaft for storing the loosely stacked cartridges and also, for removing the lowest cartridge, which occupies the playing position, with a lateral outlet aperture through which such a cartridge is automatically ejected.

It is an object of the invention to provide a simple apparatus with which a magnetic tape changer of the above-described kind may be equipped to form a system which continuously plays one cartridge after the other in an uninterrupted cycle, as may be desirable in stores for producing so-called functional music. According to the invention, for this purpose a cartridge track is provided which leads from the outlet aperture of the changer to the inlet aperture of the storing shaft and along which cartridges which have issued from the outlet aperture can be intermittently displaced by the thrust force exerted by each cartridge as it issues from the outlet aperture. Thus, each cartridge which is expelled from the outlet aperture and has just been played ensures that previously played cartridges are again conveyed into the storing shaft in which are disposed cartridges to be played, without the need for a separately driven conveying mechanism.

Advantageously the cartridge track is simply designed as a channel which adjoins the outlet aperture of the changer. It is curved substantially in the form of a circle in the direction of length of the storing shaft and terminates in a chute which leads to the inlet aperture of the storing shaft. A particularly compact apparatus is produced when the entire channel is curved in the form of a U and a freely movable endless belt is guided along the facing channel walls within the channel. The belt passes over rollers, one of which is disposed at the two open ends of the channel and the other of which is disposed at the semicircular curve, and is provided at intervals each equal to the length of a cartridge with cartridge driving members which occupy at least part of the cross-sectional area of the channel. In such an apparatus, it has proved to be especially advantageous for the conveyor belt to also be movable by hand so that cartridges arranged in the channel may be readily removed therefrom. Such apparatus invert a cartridge during its transport so that the two tracks generally provided on the tape are alternately played.

If such inversion of the cartridge is not desired, the chute may also be simply designed as a channel which is curved in a substantially semicircle in the direction of length of the storing shaft. When the channel is curved in the U-shape, for this purpose there may be provided in the outer wall of the channel in the area of its semicircular curvature and, viewed in the direction of movement of the cartridges, preceding the second longitudinal part of the channel a bag-shaped bulge which extends substantially in the direction of length of the storing shaft and into which enters one end of a cartridge being pushed through the semicircular channel curve. The cartridge then sliding out of the bulge again in the opposite direction into the adjoining second longitudinal part of the channel and being pushed forward in this part by the cartridge-driving member. In this connection it has also proved of advantage for the cartridge track to be in the form of a chute which is helically curved between the outlet aperture of the changer and the inlet aperture of the storing shaft so as to make a full turn.

The apparatus according to the invention are also suitable for use as supplements to existing magnetic tape cartridge changers so that these may, if desired, be used for playing cartridges in an uninterrupted cycle. For this purpose, the channel track is simply designed as a separate component adapted to be arranged on the changer.

It has proved of particular advantage for the storing shaft and the cartridge track to form an integral structure capable of being arranged on the changer. Suitably, on each of two opposed lateral walls of the storing shaft there is provided a holding member which is capable of being inserted into the storing shaft against spring action and engages under a cartridge disposed at the shaft end nearer the changer. These two holding members are adapted to be jointly adjusted by means of a U-shaped member arranged to pivot between two operating positions and journaled in the storing shaft so that cartridges stored in the shaft can be removed from the recorder together with the apparatus. In this connection, in a magnetic tape changer provided with a device for continuous changing of the cartridges without the cartridges being played, it has proved of advantage for the U-member when set to the operating position in which it pushes the holding members into the storing shaft, to start the continuous cartridge change device, thereby ensuring that no cartridge is left in the changer. In a particularly simple manner the above-mentioned advantages are also obtained by providing the end of the storing shaft which cooperates with the cartridge changer with at least two projections which extend into the playing position of a cartridge and engage under such a cartridge.

Advantageously there is provided in the area of the cartridge chute adjoining the outlet aperture of the changer, a locking member adapted to be manually set to either of two operating positions. The locking member in a first operating positions holds the last cartridge to have been pushed into the cartridge track and may allow some further movement of this cartridge, and in the other operating position locks the cartridge track itself in its position on the changer. As a result the apparatus is securely locked to the recorder in one position, and in the other position, the last cartridge having been pushed onto the cartridge track, is securely held when the apparatus is removed. In conjunction with the aforementioned embodiments, it has proved of advantage for the U-member to be locked, in the position in which it holds the holding members in their position of insertion into the storing shaft by the locking member when set in its first operating position, because thus with the apparatus removed from the recorder the cartridges both in the shaft and on the track are securely held.

Features and advantages of the invention will appear from the following description of the embodiments thereof, given by way of example only, with reference to the accompanying drawings, in which.

Figure 1:
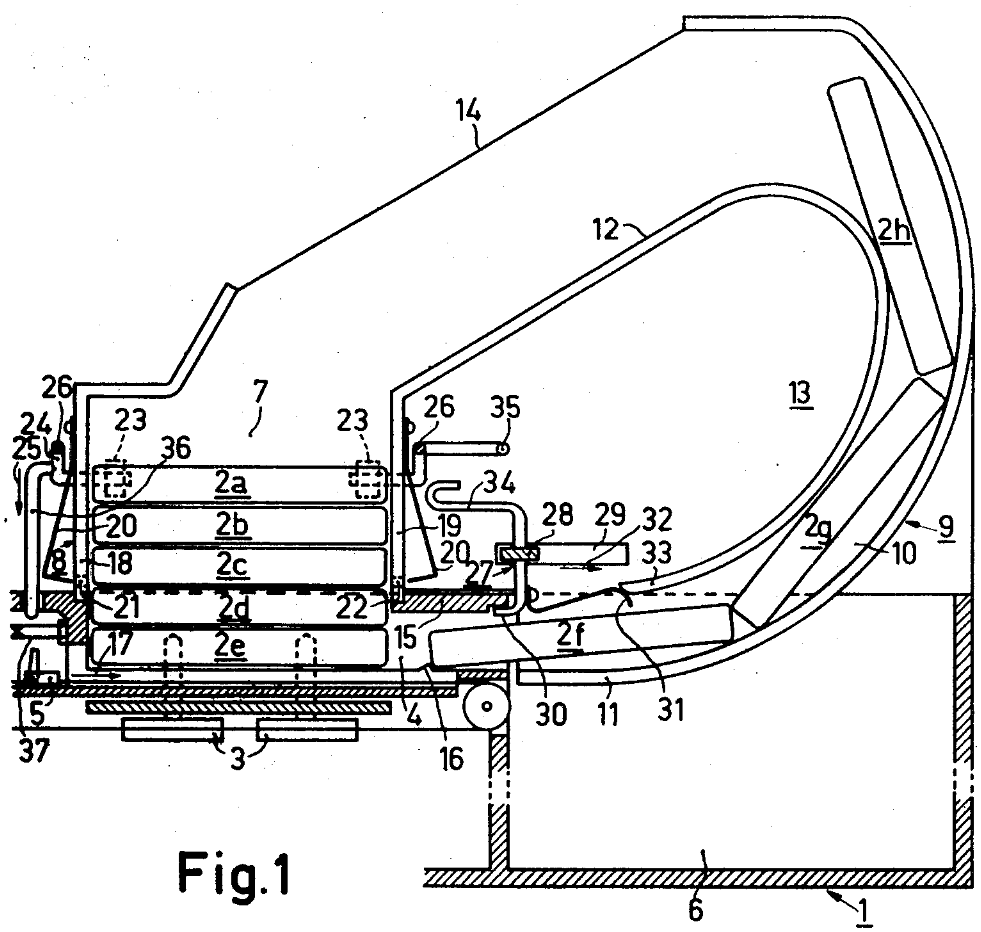
FIG. 1 shows an apparatus which is arranged on a cartridge changer and in which the cartridge track is a channel terminating in a chute.

Referring now to FIG. 1, there is shown a magnetic tape changer 1 which is designed for successively playing a plurality of stacked magnetic tap cartridges 2. First the operation of such a changer will briefly be described. The cartridges to be played are loosely stacked in a storing shaft (not shown) adapted to be placed on the changer, the lowest cartridge being in the playing position on the changer. For playing such a cartridge, driving elements 3 which grip the reel of tape in the cartridge by means of winding spindles are pivoted into their operating positions, as are the magnetic heads for reading the tape. After the playing operation, these driving and reading members are again pivoted away from the cartridge and subsequently the cartridge is pushed out of the changer by an ejector 5 adapted to be displaced in the direction of an outlet aperture 4 of the changer, which aperture is located laterally of the playing position, so that the cartridge falls into a container 6 provided on the changer beside the outlet aperture. During this ejection of the cartridge just played the next cartridge moves into the playing position, and the entire cycle is repeated.

According to the invention, there is provided an apparatus which enables the cartridges to be continuously played in an uninterrupted cycle. For this purpose, there is provided a cartridge track 9 which leads from the outlet aperture 4 of the changer to the inlet aperture 7 of a storing shaft 8 and along which cartridges issuing from the outlet aperture can be intermittently moved by the thrust force of each cartridge issuing from the outlet aperture until they are returned to the storing shaft. In the embodiment shown, the cartridge track and the storing shaft are designed as an integral unit adapted to be placed on the changer.

The cartridge track is in the form of a channel 10 a part 11 of which adjoins the outlet aperture 4 of the changer and in the direction of length of the storing shaft 8 is curved substantially into a semicircle and terminates in a chute 12 which leads to the inlet aperture 7 of the storing shaft 8. The curvature and the cross-sectional area of the channel are so matched to one another as to enable the cartridges to be readily moved along it. At the two sides which extend parallel to the plane of the drawing, the channel, the chute and the storing shaft are bounded by lateral walls 13. In the area above the chute 12 an aperture 14 is provided through which the cartridges can be manually inserted. The entire apparatus is adapted to be placed on the changer, its lateral walls 13 being supported by the open edge of the container 6 and the deck 15 of the changer, the end of the storing shaft 8 nearer the changer bearing on the edge of the aperture in the deck 15 which gives access to the playing position of a cartridge.

As FIG. 1 shows, the apparatus placed on the changer contains eight cartridges 2*a* to 2*h*. The cartridge 2*e* is in the playing position and the cartridges 2*a* to 2*d* are piled on it. The cartridge 2*a* to 2*c* are located in the storing shaft, whereas the cartridge 2*d* is already in the changer. Part of the cartridge 2*f* still lies in the outlet aperture 4, while the remainder is already in the channel 10. In front of the cartridge 2*f* two other cartridges 2*g* and 2*h* are disposed in the channel 10, the cartridge 2*h* being supported by the cartridge 2*g* which in turn is supported by the cartridge 2*f* the position of which is determined by a projection 16 on the bottom of the aperture 4.

When the cartridge 2*l* has been played, the driving members 3 and the magnetic heads, not shown, are automatically pivoted away and the ejector 5 is actuated in the direction of the arrow 17 so that the cartridge is moved from the playing position and is pushed out of the changer through the outlet aperture 4. During this displacement the cartridge 2*e* slides over the projection 16 and strikes the cartridge 2*f*, pushing it forward. The cartridge 2*f* in its turn pushes the cartridge 2*g* along the channel and this cartridge 2*g* pushes the cartridge 2*h* before it. Thus, the cartridge 2*h* is moved onto the chute 12 and slides down it through the inlet aperture 7 into the storing shaft 8. Such an operation is repeated each time a cartridge is removed from the playing position.

As will be clear from the above, the cartridges present in the apparatus are played in an uninterrupted sequence. While travelling along the track the cartridges are inverted, i.e. the lower surface of a cartridge in the playing position will be its upper surface when it enters the storing shaft. When the tape contained in such a cartridge is provided in the usual manner with two tracks for opposite directions of movement of the tape relative to the two tape reels, after each passage of the cartridge through the apparatus the track to be played will be changed.

In order to enable the unit comprising the cartridge channel and the storing shaft to be readily removed from the changer the following has been provided.

Each of the two opposite lateral walls 18 and 19 of the storing shaft 8 is provided with a holding member 20 which is resilient and shaped in the form of a hook, and in the inoperative position the free hook end is arranged in front of an aperture 21 or 22 in the lateral wall 18 or 19 respectively of the storing shaft. These apertures 21 and 22 are provided in the end of the shaft nearer the changer. A U-shaped member 24, is journaled in bearing flanges 23 provided on one of the lateral walls 13 of the storing shaft and embraces this shaft. It is adapted to pivot between two operating positions and is arranged to operate the holding members. When the U-member is moved from the operating position shown in FIG. 1 in the direction of the arrow 25, for example by hand, its parts 26 press down on the hooks so that the free hook ends enter the apertures 19 and 20 and engage under a cartridge (2*c*) disposed in the shaft end nearer the changer, with the result that no cartridge can leave the storing shaft.

Figure 2:
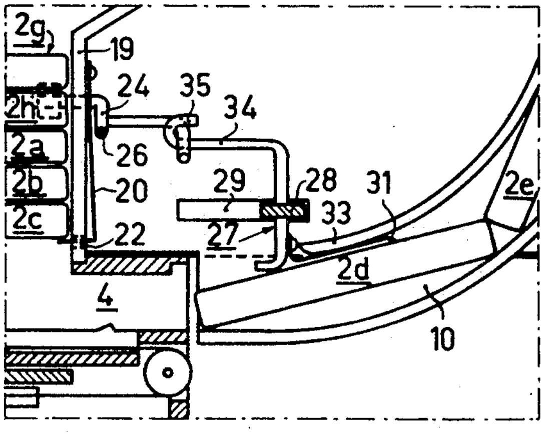
FIG. 2 shows, by way of illustration of the operation of the embodiment shown in FIG. 1, part of FIG. 1 which shows the apparatus ready for removal from the changer.

Furthermore, in the area of the part of the cartridge track adjoining the outlet aperture 4 of the changer a locking member 27 is provided adapted to be manually set to either of two operating positions. This locking member has a transverse part 28 adapted to slide in slits 29 provided in the lateral walls 13 and a bent end 30 to which is secured a leaf spring 31 extending towards the open channel end. This leaf spring serves to push the cartridge (2*f*) just removed from the playing position completely into the channel 10 and to hold it in this position. When the locking member 27 is moved in the direction indicated by the arrow 32 from the second operating position shown in FIG. 1 to a first operating position, the spring 31 grips such a cartridge 2*f*, pushes it completely out of the outlet aperture 4 and in conjunction with the channel wall 33 holds the cartridge, as is shown in FIG. 2. This ensures that the cartridge track can be taken from the changer without a cartridge still partly disposed in the outlet aperture 4 preventing this removal and also that cartridges disposed in the channel 10 cannot slide back and drop out.

In the second operating position of the locking member 27, which position is shown in FIG. 1, the bent end 30 of this member engages under the deck 15 and thus locks the cartridge track and the storing shaft to the changer so that this apparatus cannot inadvertently be removed.

The locking member 27 is further provided with a hook 34 which cooperates with a projection 35 on the U-member 24 so as to lock this member. When the unit comprising the cartridge track and the storing shaft is to be taken from the changer, the U-member 24 is first moved in the direction indicated by the arrow 25, so that the cartridges 2*a* to 2*c* are held in the storing shaft. Then the locking member 27 is displaced in the direction indicated by the arrow 32, so that the cartridge 2*f* is pushed into the channel 10 and held while the cartridge track is freed from the changer in the manner described and simultaneously the U-member 24 is locked by the hook 34 now gripping the projection 35 and is held in this position (FIG. 2). Thus, the entire unit can readily be removed from the changer and the cartridges contained in the unit cannot unintentionally drop out.

When, in the embodiment described, the cartridge track together with the storing shaft is removed, the two cartridges 2*d* and 2*e* remain on the changer. In a changer having an arrangement for a continual change of cartridges without the cartridges being played, this may simply be avoided by causing the U-member 24 when moved in the direction indicated by the arrow 25 to actuate the arrangement for continual cartridge change by means of an extension 36, for which purpose the extension 36 may operate a switch 37 shown schematically or may directly actuate the operating member concerned. Since the cartridges 2*a* to 2*c* are then held in the storing shaft by the holding members 20, the continuous cartridge change operation only removes the two cartridges 2*e* and 2*d* and subsequently in the manner described the locking member 27 may be actuated so that finally all the cartridges are disposed in the cartridge track and the storing shaft.

Figure 3:
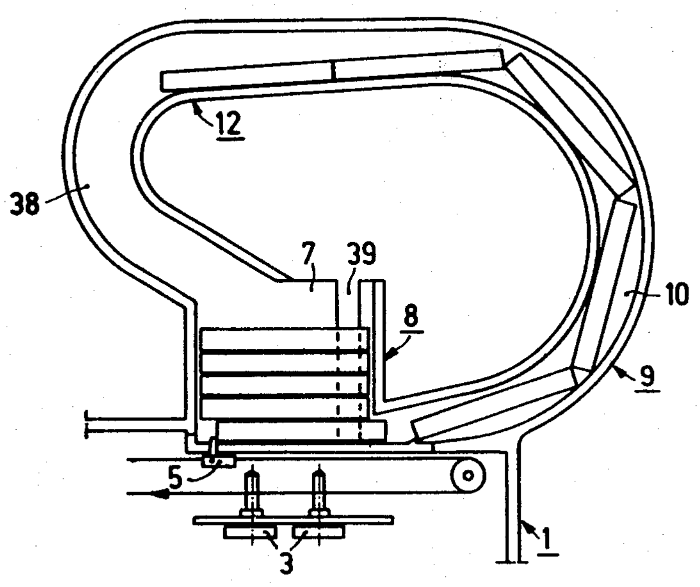
FIG. 3 is a modification of the embodiment of FIG. 1, in which the apparatus is fixedly arranged on the changer and the chute also is in the form of a channel.

In the embodiment shown in FIG. 3, the cartridge track 9 and the storing shaft 8 are directly secured to the changer 1. The cartridge track 9 is distinguished from that shown in FIG. 1 in that the chute 12 also is in the form of a channel 38 which in the direction of length of the storing shaft is curved substantially into a semicircle. Thus, the cartridges return to the storing shaft in the same position in which they have been removed from the playing position, since in travelling through the channels of the cartridge track they have made a full turn. Such an arrangement is suitable for changers in which before the ejection of a cartridge from the playing position the tape is automatically rewound and, as the case may be, a second track is immediately played. The cartridge can be inserted into the shaft 8 through the aperture 7. Two opposite lateral walls of the storing shaft are each provided with a slit 39 so that the cartridges may laterally be grasped for removal from the shaft.

Figure 4:
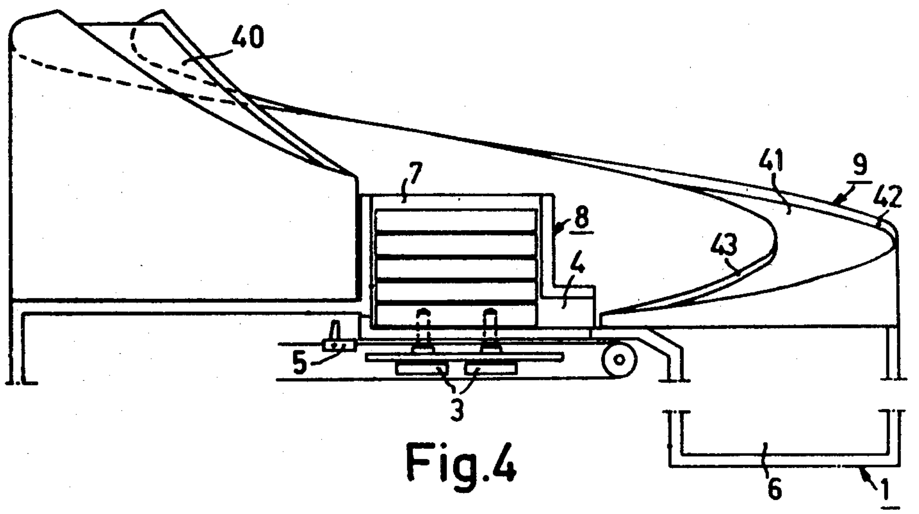
FIG. 4 shows a helically designed cartridge track.

FIG. 4 shows an embodiment in which the cartridge track 9 alone is adapted to be placed as a separate component on the changer, so that the latter may be used with or without the track. If desired, the storing shaft 8 also may be individually removable. In this embodiment the cartridge track is helically curved from the outlet aperture 4 of the changer to the inlet aperture 7 of the storing shaft 8 so as to make a full turn. The cartridges are moved along this track to a point above the level of the inlet aperture 7 and then slide down the last track part 40 into the storing shaft 8. Similarly to what is the case in the embodiment of FIG. 3, the cartridges are not inverted. The track comprises a simple chute 41 which is provided with lateral walls 42 and 43 to prevent the cartridges from falling off. Consequently, all the cartridges present on the track are always accessible from above so that they can simply be removed or exchanged.

Figure 5:
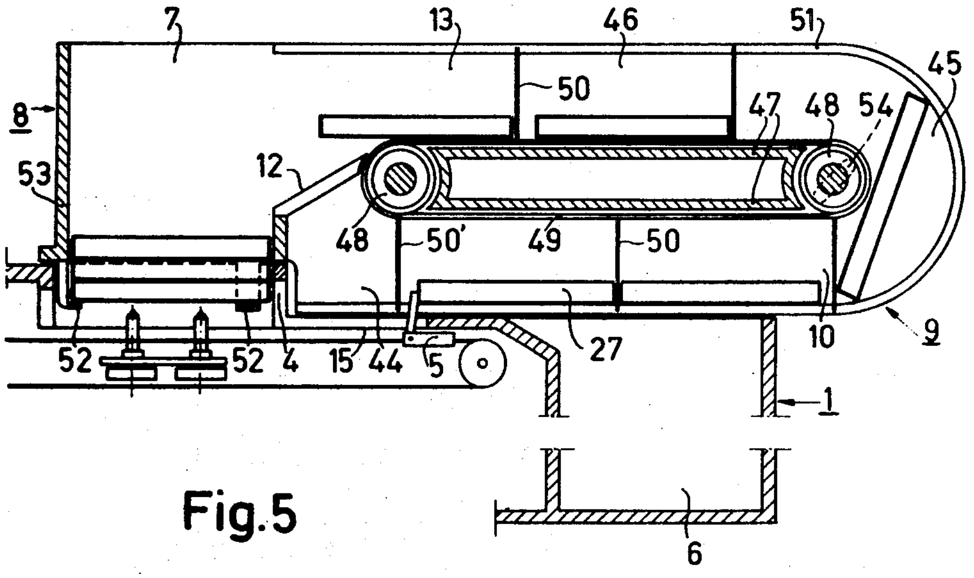
FIG. 5 shows a cartridge track in the form of a U-shaped channel provided with a belt conveyor.

In the embodiment shown in FIG. 5, the cartridge track 9 and the storing shaft 8 again form a unit adapted to be placed on the changer 1. The cartridge track leading from the outlet aperture 4 of the changer to the chute 12 here takes the form of a channel 10 curved into the form of a U. The channel comprises a first straight part 44 adjoining the outlet aperture 4, a semicircular curved part 45 and a second straight part 46. Along the two inner opposed walls 47 of the channel there is guided an endless conveyor belt which is freely movable and at the two open channel ends and at the semicircular channel curve runs over rollers 48 and is provided with strip-shaped cartridge driving members 50 spaced from one another by distances equal to the length of a cartridge. The free ends of these driving members extend into a slit in the outer wall 51 of the cartridge track so that they protrude into the channel from the inner wall to the outer wall thereof. In the direction from one lateral wall 13 of the cartridge track to the other the driving members are narrower than the transverse dimension of the cartridges. To enable the driving members to get from the channel part 46 to the channel part 44 the chute 12 is provided with a corresponding slit. The ejector 5 by means of which the cartridge situated in the playing position is pushed out through the outlet aperture 4, here is arranged to be moved into the channel part 44 in a plane extending beside the driving members 50 and projects through slits in the deck 15 and the outer wall 51 of the cartridge track.

When a cartridge is removed from the playing position by the ejector 5, it passes through the outlet aperture 4 into the channel part 44. Thus it strikes the driving member 50′ which it pushes before it during the remainder of its movement in the channel until finally at the end of the range of the ejector it reaches the position occupied by the cartridge 2*f* in FIG. 5. Since such a cartridge pushes before it the driving member in front of it, the entire conveyor belt 49 is actuated and each driving member pushes a cartridge before it. When a cartridge reaches the curve 45 it is effectively raised into the channel part 46 and simultaneously inverted by the driving member following it. In the channel part 46 it is again moved on step by step until it reaches the chute 12 and slides into the storing shaft.

This arrangement has the particular advantage that, viewed in the direction of length of the storing shaft 8, it can be made comparatively low since the cartridges are raised through the channel curve 45.

In this embodiment the storing shaft 8 at its end cooperating with the changer is provided with three projections 52 which extend into the playing position of a cartridge and engage under a cartridge located in this position. One of these projections is arranged on the lateral wall 53 of the storing shaft and the others are each provided on one of the lateral walls 13. This ensures that when the apparatus is removed from the changer not only the cartridges present in the channel but also all the cartridges contained in the storing shaft, including that in the playing position, are removed. The cartridges can be taken from the apparatus through the aperture 7, and cartridges which may be located in the channel can be moved into the storing shaft by means of the conveyor belt, which is adapted to be externally moved by hand, for which purpose on of the rollers 48 has a handle 54 projecting beyond the lateral wall 13.

Figure 6:
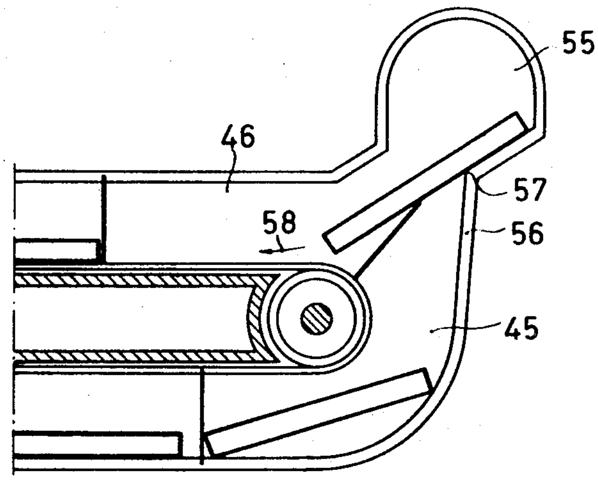
FIG. 6 shows a modification of the embodiment of FIG. 5, in which similarly to the embodiments shown in FIG. 3 and 4 a cartridge is returned to the storing shaft in the same position.

As has been mentioned hereinbefore, in the embodiment shown in FIG. 5 the cartridges are inverted during transport. If, however, the cartridges are to be introduced into the storing shaft with the same side down, the semicircularly curved channel part 45 may simply be provided with a bag-shaped bulge 55 which extends in the direction of length of the storing shaft and precedes the second straight channel part 46, as is shown in FIG. 6. When in this case a cartridge is moved through the channel curve 45 by the associated driving member 50, it is raised into the bulge 50 along the inclined wall part 56 until it tips over about the edge 57 and then slides into the channel part 46 in the direction indicated by the arrow 58, as is shown in FIG. 6.

Obviously, many modifications of the above-described embodiments are possible without departing from the scope of the invention.

I claim:

1. A conveying apparatus for a magnetic tape cartridge changer for playing a plurality of stacked magnetic tape cartridges in sequence, in which the changer is provided with a shaft for storing loosely stacked cartridges, and also including means for removing the lowest cartridge from the playing position which it occupies through a lateral outlet aperture through which such a cartridge is automatically ejected by being horizontally slid therethrough, said conveying apparatus comprising, a cartridge track extending from the outlet aperture of the changer to the inlet aperture of the storing shaft and along which cartridges which have issued from the outlet aperture can be intermittently displaced in edge-to-edge relation by the thrust force exerted by each cartridge as it issues from the outlet aperture, the cartridge last ejected onto said track being displaced along said track in substantially the same direction in which the cartridge being ejected is moved onto said track.

2. An apparatus as claimed in claim 1, wherein the cartridge track has the form of a channel which adjoins the outlet aperture of the changer, is curved substantially in the form of a semicircle in the direction of length of the storing shaft and terminates in a chute which leads to the inlet aperture of the storing shaft.

3. An apparatus as claimed in claim 1, wherein the cartridge track is in the form of a chute which is helically curved from the outlet aperture of the changer to the inlet aperture of the storing shaft so as to describe a full turn.

4. An apparatus as claimed in claim 2, wherein the entire channel is curved in the form of a U and further comprising a freely movable endless conveyor belt mounted at its ends about rotatably mounted rollers and guided along the facing inner channel walls, and a plurality of cartridge driving members driven by said belt and spaced from one another by distances equal to the length of a cartridge travelling in the channel, said members occupying at least part of the cross-sectional area of the channel.

5. An apparatus as claimed in claim 4, further comprising means for manually moving said conveyor belt so as to enable cartridges contained in the channel to be removed therefrom.

6. An apparatus as claimed in claim 4, further comprising a bag-shaped bulge provided in the outer wall of the channel in the area of its semicircular curve, said bag-shaped bulge extending substantially in the direction of length of the storing shaft and into which a cartridge being pushed through the semicircular channel curve enters at one end and then, under the action of the associated cartridge-driving member, slides out of the bulge in the opposite direction and into the adjoining second straight channel part in which it is moved on.

7. An apparatus as claimed in claim 2, wherein the chute is also designed as a channel curved substantially in the form of a semicircle in the direction of length of the storing shaft.

8. An apparatus as claimed in claim 1, wherein the cartridge track is a separate component adapted to be mounted on the changer.

9. An apparatus as claimed in claim 1, wherein the storing shaft and the cartridge track together form a unit adapted to be mounted on the changer.

10. An apparatus as claimed in claim 9, further comprising a holding member mounted at each of two opposed lateral walls of the storing shaft, a portion of said holding member being adapted to be inserted into the storing shaft against spring action for engagement under a cartridge located at the end of the shaft adjacent the changer, and a U-shaped member arranged to pivot between two operating positions and supported from the storing shaft for controlling operation of said holding members.

11. An apparatus as claimed in claim 10 for use in a magnetic tape changer provided with an arrangement for continually changing the cartridges without the latter being played, wherein the U-member when set to the operating position in which it inserts the holding members into the storing shaft actuates the arrangement for continual cartridges change.

12. An apparatus as claimed in claim 9, further comprising at least two projections arranged at the end of the storing shaft for cooperation with the cartridge changer, said projections extend into the playing position of a cartridge and engage under a cartridge situated in this position.

13. An apparatus as claimed in claim 1 further comprising a locking member arranged in the area of the cartridge track which adjoins the outlet aperture of the changer and adapted to be set to either of two operating positions, said member when in the first operating position holds the last cartridge having been pushed onto the cartridge track and may move this cartridge and when in the second operation position locks the cartridge track itself in its position on the changer.

14. An apparatus as claimed in claim 10, further comprising a locking member arranged in the area of the cartridge track which adjoins the outlet aperture of the changer and adapted to be set to either of two operating positions, said member when in the first operating position holds the last cartridge having been pushed onto the cartridge track and may move this cartridge and when in the second operating position locks the cartridge track itself in its position on the changer, said U-member being locked in the position in which it maintains the holding members inserted into the storing shaft by the locking member when set to the first operating position.

15. A conveying apparatus for a magnetic tape cartridge changer for playing a plurality of stacked magnetic tape cartridges in sequence, in which the changer is provided with a shaft for storing loosely stacked cartridges, and also including means for removing the lowest cartridge which occupies the playing position through a lateral outlet aperture through which such a cartridge is automatically ejected, said apparatus comprising a cartridge track which extends from the outlet aperture of the changer to the inlet aperture of the storing shaft and along which cartridges which have issued from the outlet aperture can be intermittently displaced by the thrust force exerted by each cartridge as it issues from the outlet aperture, said cartridge track having the form of a channel which adjoins the outlet aperture of the changer, and is curved substantially in the form of a semicircle in the direction of length of the storing shaft and terminates in a chute which leads to the inlet aperture of the storing shaft.

* * * * *